United States Patent
Grencavich

[19]

[11] Patent Number: 5,993,931
[45] Date of Patent: Nov. 30, 1999

[54] HERMETIC SOLDER LID CLOSURE

[75] Inventor: Robert Grencavich, Kempton, Pa.

[73] Assignee: Lucent Technologies Inc, Murray Hill, N.J.

[21] Appl. No.: 08/884,870

[22] Filed: Jun. 30, 1997

[51] Int. Cl.[6] .................................................. B32B 3/00
[52] U.S. Cl. ........................ 428/66.3; 73/49.2; 73/49.3; 73/52; 216/39; 228/103; 228/111.5; 228/262.3; 428/63; 428/66.4; 428/66.6; 428/137
[58] Field of Search ........................ 428/66.3, 63, 66.4, 428/66.6, 137; 338/307, 309; 219/209, 543; 29/613; 174/52.4; 73/49.2, 49.3, 52, 40; 216/39; 228/103, 111.5, 262.3

[56] References Cited

U.S. PATENT DOCUMENTS

| | | | |
|---|---|---|---|
| 4,119,363 | 10/1978 | Camlibel | 350/96.2 |
| 4,410,874 | 10/1983 | Scapple | 338/307 |
| 4,699,456 | 10/1987 | Mackenzie | 350/96.2 |
| 4,987,478 | 1/1991 | Braun | 357/81 |
| 5,139,972 | 8/1992 | Neugebauer | 433/209 |

*Primary Examiner*—Nasser Ahmad
*Attorney, Agent, or Firm*—Gibbons, Deldeo, Dolan, Griffinger & Vecchione

[57] ABSTRACT

A method for leak testing of a hermetic package closure comprises the steps of: creating a pocket in a lid; plating the lid; placing solder in the pocket; melting the solder in the pocket; drilling a hole through the solder and the plated lid creating an unplated area on the plated lid; testing the hermetic package closure for leaks through the hole; heating the solder reflow, wherein surface tension of the solder over the hole and the unplated area enable the solder to form a hermetic closure.

19 Claims, 1 Drawing Sheet

HERMETIC SOLDER LID CLOSURE

FIELD OF THE INVENTION

This invention relates to packaging optical fibers, and more particularly to leak testing and hermetically sealing a housing.

BACKGROUND OF THE INVENTION

Optical communication systems are desirable because of the wide bandwidths available for the information signal channels. In general, there is a direct trade off between increased bandwidth capabilities and vulnerability to large scale channel disruption by transmission medium failure. The robustness of an optical fiber is increasingly important with increasing bandwidth capability.

Signals fade with distance while traveling through any type of cable. The greater the distance the fainter the signal becomes. When a digital signal fades the bit error rate rises rapidly. When an analog signal fades it becomes distorted or noisy. Communication system utilize amplifiers or repeaters coupled to the cables to overcome this problem.

Lightwave repeaters, regenerators and optical amplifiers extend transmission distances of light signals. Inserted into a fiber system at a point where the original light signal becomes weak, they generate a stronger signal, effectively extending the operating distances. Repeaters and regenerators convert the light signal into an electrical signal before amplifying the signal. Optical amplifiers directly amplify the light signal. It is desirable to hermetically seal the repeaters, regenerators, optical amplifiers and other devices within a housing to prevent deterioration due to atmospheric conditions. This is particularly necessary for buried terrestrial or submarine optical fiber systems. The fact that the optical fiber cores have a very small diameter (typically 8 to 9 $\mu$m) makes them susceptible to damage and difficult to handle.

U.S. Pat. No. 4,119,363, entitled "Package For Optical Devices Including Optical Fiber-To-Metal Hermetic Seal", issued on Oct. 10, 1978 to Irfan Camlibel et al, discloses an optical fiber that is hermetically sealed to a metal housing, where solder filling a thin walled metal tube forms a hermetic seal. The end of the optical fiber that is inserted into the tube is stripped to the bare optical fiber.

U.S. Pat. No. 4,699,456, entitled "Hermetic Fiber Seal", issued on Oct. 13, 1987 to Donald R. Mackenzie, discloses an assembly for hermetically sealing and aligning optical fibers. An end of the optical fiber is stripped to the bare optical fiber before inserting into the device. Pressure from a flange onto a gold ring forms the hermetic seal.

He absorption by Teflon RF connectors and optical fiber jacketing poses a difficulty in leak testing a hermetic seal to a LiNbO$_3$ package. The present commercial practice that is used to address this problem involves drilling a hole through the lid prior to plating. Reflux solder is melted on the lid surface, after sealing, to create a closure. This may be used to allow outgassing of the package and not be used to test for hermeticity. Additionally, there has been used a crimp tube attached to the package which is then pinched off to create a closure.

Therefore, there is a need for an inexpensive and reliable way to leak test and create a hermetic seal to a LiNbO$_3$ package.

SUMMARY OF THE INVENTION

The present invention is a method and apparatus for leak testing of a hermetic package closure. The method comprising the steps of: creating a pocket in a lid; plating said lid; placing solder in said pocket; melting said solder in said pocket; drilling a hole through said solder and said plated lid creating an unplated area on said plated lid; testing the hermetic package closure for leaks through said hole; heating said solder reflow, wherein surface tension of said solder over said hole and said unplated area enable said solder to form a hermetic closure. An apparatus is also described in accordance with the present invention.

DESCRIPTION OF THE DRAWINGS

The present invention is described in detail below in conjunction with the drawings, of which.

DETAILED DESCRIPTION OF VARIOUS ILLUSTRATIVE EMBODIMENTS

Figure 1:
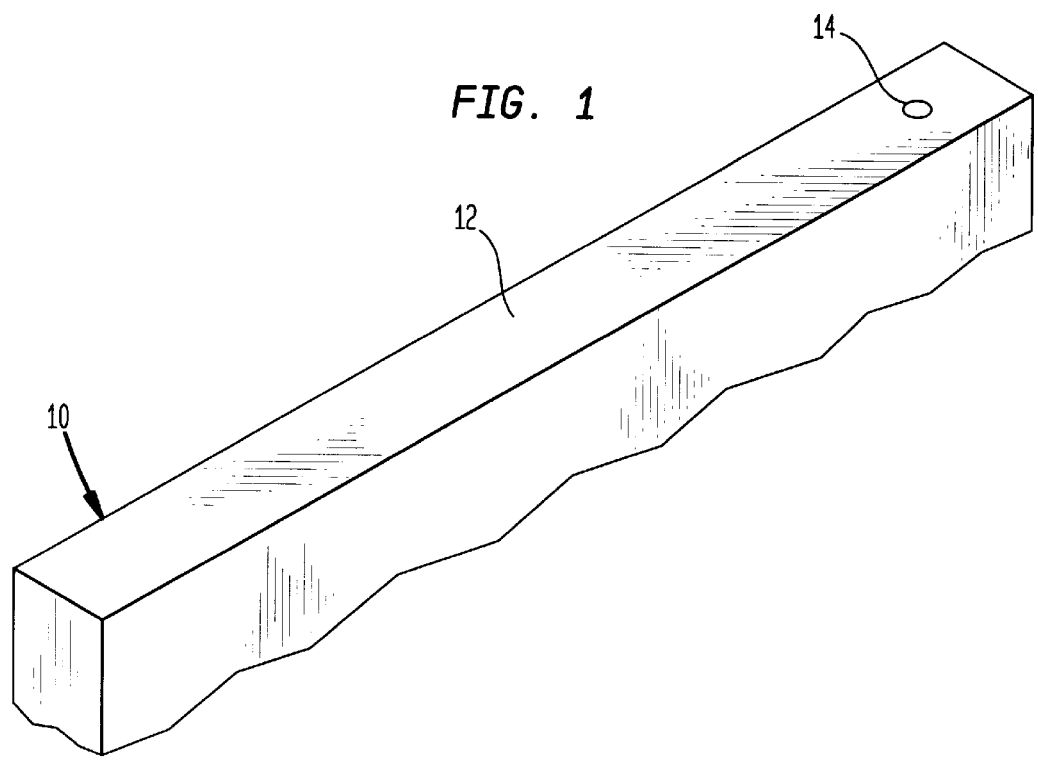
FIG. 1 shows a partial perspective view of a package with the present invention.

Referring to FIG. 1 there is shown perspective view of a package with the present invention. A package 10 such as a LiNbO$_3$ package has a lid 12. The lid 12 creates a hermetic seal to the LiNbO$_3$ package. The lid 12 is shown with the hermetic solder seal 14 closed.

Figure 2:
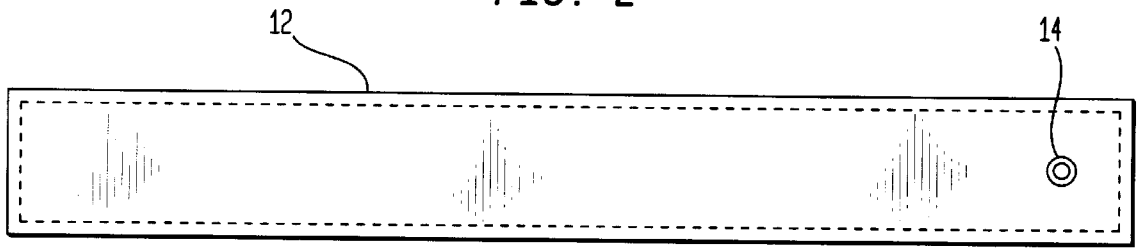
FIG. 2 shows a top view of the lid from the package with the present invention.
Figure 3:
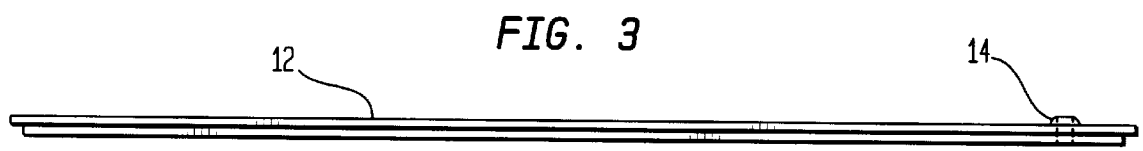
FIG. 3 shows a side view of the lid.
Figure 4:
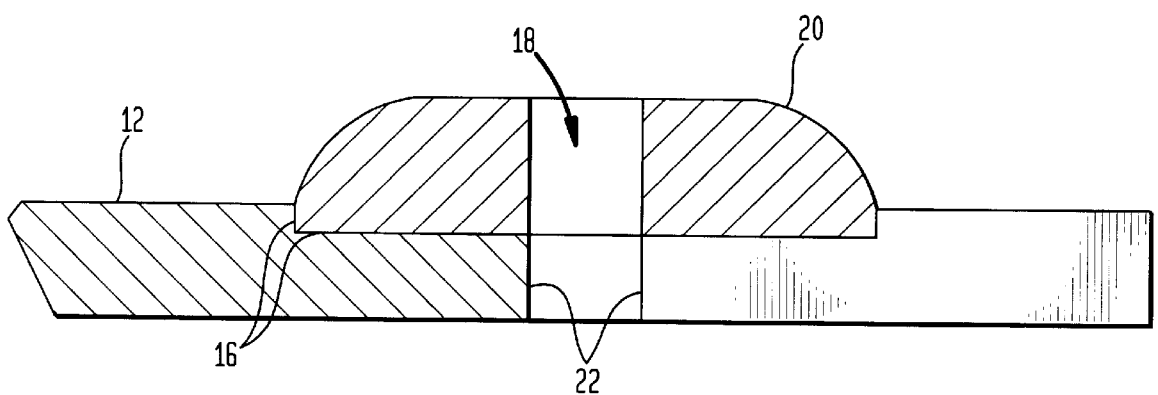
FIG. 4 shows detail cross section of the present invention.

FIG. 2 shows a top view of the lid from the package with the present invention. FIG. 3 shows a side view of the lid. FIG. 4 shows detail cross section of the present invention. Referring to FIGS. 2, 3 and 4 together there is shown a view of the lid 12 prior to closure of the hermetic solder seal 14. In a representative embodiment the lid may be made of KOVAR. A location for the hermetic solder seal 14 is selected. During the chemical etching of the lid 12, a pocket 16 is created having a diameter of approximately 0.100" and a depth of 0.005". The lid 12 is then plated to 100–200 microinches with electroless nickel. A fluxed solder, such as 63Sn/37Pb is placed in the pocket 16 and heated to melting temperature, thereby attaching the solder to the lid and constraining the solder's location. A 0.020" hole 18 is then drilled through the solder bump 20 and the lid. The hole 18 is drilled from the solder side which is important in order to avoid the creation of a burr from the lid inside the solder bump 20. This process creates an unplated surface 22 which is perpendicular to the solder bump and is constrained within the 0.020" diameter hole 18. The lid 12 is cleaned and seam sealed to the package 10 (shown in FIG. 1). After seam sealing, the package 10 is leak tested. The leak testing of the package 10 is accomplished through the hole 18 in the lid 12 by evacuation of the package on a leak tester and spraying He around the outer surfaces. After successful testing, the package is vacuumed baked and back filled with 15% He in N$_2$ through the hole 18. The package is placed in a 15% He in N$_2$ environment and a heated iron is used to reflow the solder bump, thereby creating a hermetic seal. Because of the surface tension of the solder over the 0.020" diameter hole 18 and the unplated surface 22 within the 0.020" diameter hole 18, the solder creates a hermetic closure, and is constrained in the 0.100" pocket 16. A visual inspection of the solder joint is performed as well as a final leak test on the solder seal itself.

The process allows the creation of a hermetic package closure, through the reflow of solder, that does not require the use of flux or the cleaning of flux from the hermetic package.

Numerous modifications and alternative embodiments of the invention will be apparent of those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

What is claimed is:

1. A method for leak testing of a hermetic package closure comprising, in sequence, the steps of:

creating a pocket in a lid;

plating said lid;

placing solder in said pocket;

melting said solder in said pocket, wherein said solder forms a solder bump attached to said pocket;

drilling a hole through said solder bump and said plated lid creating an unplated area on said plated lid;

testing the hermetic package closure for leaks through said hole;

heating said solder bump to reflow, wherein surface tension of said heated solder bump over said hole and said unplated area enable said heated solder bump to form a hermetic closure.

2. The method as recited in claim 1 wherein said pocket is created by chemical etching.

3. The method as recited in claim 1 wherein said pocket is approximately 0.1" in diameter and 0.005" deep.

4. The method as recited in claim 1 wherein said plating comprises electroless nickel.

5. The method as recited in claim 1 wherein said plating is approximately 100–200 microinches.

6. The method as recited in claim 1 wherein said solder is 63Sn/37Pb.

7. The method as recited in claim 1 wherein said solder undergoes a flux treatment before melting.

8. The method as recited in claim 1 wherein said hole is drilled through said solder first.

9. The method as recited in claim 1 wherein said hole is approximately 0.02" in diameter.

10. The method as recited in claim 1 wherein the step of testing comprises spraying Helium onto the hermetic package closure.

11. The method as recited in claim 1 further comprising the step of vacuum baking and back filling the hermetic package closure.

12. The method as recited in claim 11 where in said back filling comprises approximately 15% Helium in Nitrogen.

13. The method as recited in claim 1 wherein the step of heating is done in an environment of approximately 15% Helium in Nitrogen.

14. A testing closure in a hermetic package comprising:

a plated lid having pocket; and a bump of solder contained by said pocket, said bump of solder and said lid having a hole wherein a surface of said plated lid within said hole is unplated;

wherein said unplated surface enables said bump of solder to form a hermetic seal when said solder is reflowed.

15. The testing closure as recited in claim 14 wherein said pocket is approximately 0.1" in diameter and 0.005" deep.

16. The testing closure as recited in claim 14 wherein said plating comprises electroless nickel.

17. The testing closure as recited in claim 14 wherein said plating is approximately 100–200 microinches.

18. The testing closure as recited in claim 14 wherein said solder is 63Sn/37Pb.

19. The testing closure as recited in claim 14 wherein said hole is approximately 0.02" in diameter.

* * * * *